(No Model.)

T. S. FITCH.
FRUIT HOLDING POCKET.

No. 564,605. Patented July 28, 1896.

Witnesses:
M. Regner
Marcus Levi

Inventor:
Thaddeus S. Fitch
By Osborn
his Attys.

UNITED STATES PATENT OFFICE.

THADDEUS S. FITCH, OF SAN FRANCISCO, CALIFORNIA, ASSIGNOR OF TWO-THIRDS TO HENRY L. McKELLOPS, OF SAME PLACE.

FRUIT-HOLDING POCKET.

SPECIFICATION forming part of Letters Patent No. 564,605, dated July 28, 1896.

Application filed October 17, 1894. Serial No. 526,210. (No model.)

*To all whom it may concern:*

Be it known that I, THADDEUS S. FITCH, a citizen of the United States, residing in the city and county of San Francisco, State of California, have invented a new and useful Fruit-Holding Pocket, of which the following is a specification.

This invention relates to an individual fruit-holding device or pocket in which a fruit, egg, or vegetable is enveloped or wrapped and then packed in a box for transportation.

The object of my invention is to produce a fruit-holding pocket that will keep the fruit in an upright position; and also one that will contract around the fruit as it shrinks in handling or transportation and hold it firmly in position until a market is found.

To attain this end my invention consists, essentially, in an open-ended envelope of cardboard folded double centrally and with the upper edges cut slightly rounding and the lower edges cut slightly dishing, so that when the free ends are united and set on end an expansible pocket or wrapper will be formed that will hold a fruit in a suspended position and permit a free circulation of air, as will more fully appear by reference to the following description and accompanying drawings.

Figure 1:
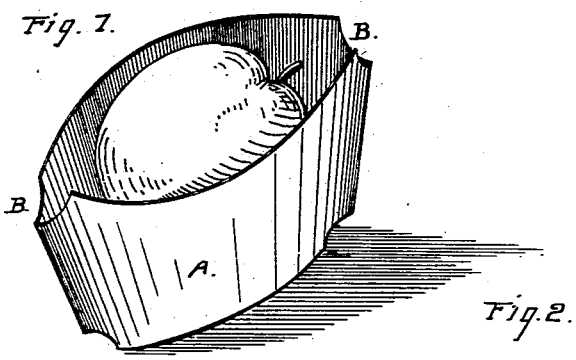
Figure 2:
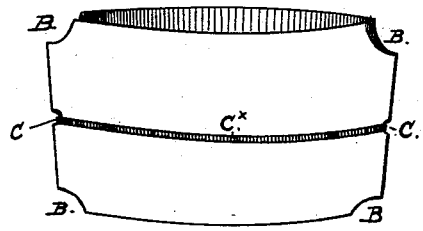
Figure 3:
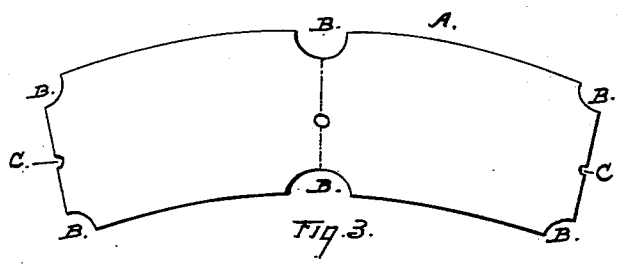
Figure 4:
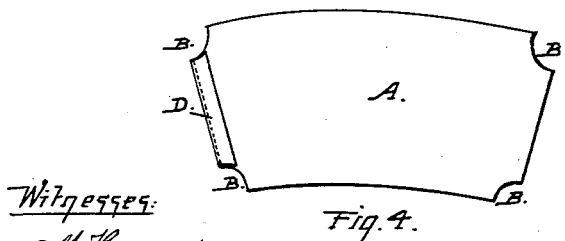

In the drawings, Figure 1 is a perspective view of a pocket containing the fruit. Fig. 2 shows a pocket collapsed before the fruit is put in. Fig. 3 is a view of the cut blank before it is folded. Fig. 4 is a view of the folded blank with the edges at one side united by a lap-joint and omitting the notches for the rubber band.

A represents the blank of card or straw board of which my pocket is composed, and is folded double with the upper edges cut slighly rounding and the lower edges made slightly dishing to produce the desired shape when set up.

Each of the four corners is notched, as at B B, to provide for ventilation when set up, or one of which may afford space for the neck or stem of a pear. Notches are also made in the ends of the blanks intermediate the corner-notches, as at C C, to hold in place a rubber band C$^\times$. The rubber band may, however, be dispensed with in case both ends of the wrapper are sealed, as shown at D, Fig. 4. The object in all cases is to make the pocket or wrapper expansible and contractable, expansible when receiving the fruit and contractable when the fruit shrinks, so as to keep the fruit always at rest and suspended in the wrapper with the spring of the material of which it is composed sufficient to take up the shrinkage as fast as it takes place.

The cutting of the blanks of which the pocket or wrapper is composed is such that when expanded it will be conical with the smallest diameter at the base, as shown at Fig. 2, and by such construction the fruit will be kept in a suspended position when both ends of the blanks are sealed, even without the use of the rubber band, yet the latter will be useful when packing larger fruits with smaller in the same case for transportation.

The board forming the blanks may be folded and cut double and the free ends glued together or the free ends left open and the blanks notched for a rubber band, or the blanks may be cut singly and placed in pairs and stayed by rubber bands.

These pockets or wrappers are placed in boxes of suitable size for transportation, and the fruit when so packed will keep fresh for a much longer period of time than when packed closely together, and at the same time will be free from bruises when a market is reached.

Having thus described my invention, what I claim, and desire to secure by Letters Patent, is—

As an improved article of manufacture a downwardly-tapering and normally-closing single-cell fruit-holding pocket cut from a single blank of cardboard or the like rounding along its upper end dishing along its lower edge, folded into two curved sides with angles at their ends, and the extremities of the blank being rigidly connected with each other, as and for the purpose set forth.

In testimony that I claim the foregoing I have hereunto set my hand and seal.

THADDEUS S. FITCH. [L. S.]

Witnesses:
C. W. M. SMITH,
CHAS. E. KELLY.